United States Patent
Mochizuki (10) Patent No.: US 11,255,702 B2
(45) Date of Patent: Feb. 22, 2022

(54) ANGLE SENSOR AND ANGLE SENSOR SYSTEM

(71) Applicant: TDK CORPORATION, Tokyo (JP)

(72) Inventor: Shinichirou Mochizuki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 290 days.

(21) Appl. No.: 16/671,449

(22) Filed: Nov. 1, 2019

(65) Prior Publication Data

US 2020/0166381 A1 May 28, 2020

(30) Foreign Application Priority Data

Nov. 22, 2018 (JP) .............................. JP2018-219005

(51) Int. Cl.
*G01D 5/244* (2006.01)

(52) U.S. Cl.
CPC ................ *G01D 5/24476* (2013.01)

(58) Field of Classification Search
CPC ....... G01D 5/24476; G01D 5/145; G01B 7/30
See application file for complete search history.

(56) References Cited

U.S. PATENT DOCUMENTS

| | | | | |
|---|---|---|---|---|
| 2009/0315547 A1* | 12/2009 | Abwa | ..................... | G01R 33/02 324/244 |
| 2015/0025761 A1* | 1/2015 | Kernebeck | ............ | F16H 59/105 701/60 |
| 2018/0164127 A1 | 6/2018 | Anagawa et al. | | |
| 2018/0238711 A1* | 8/2018 | Zimmer | .................. | G01D 5/145 |
| 2018/0274896 A1* | 9/2018 | Anagawa | ............... | G01R 33/09 |

FOREIGN PATENT DOCUMENTS

| | | |
|---|---|---|
| JP | 2001-124507 A | 5/2001 |
| JP | 2016-186475 A | 10/2016 |
| WO | 2016/204205 A1 | 12/2016 |

OTHER PUBLICATIONS

Translation of Dec. 1, 2020 Office Action issued in Japanese Patent Application No. 2018-219005.

* cited by examiner

*Primary Examiner* — Alvaro E Fortich
*Assistant Examiner* — Zannatul Ferdous
(74) *Attorney, Agent, or Firm* — Oliff PLC (57) ABSTRACT

An angle sensor includes a plurality of magnetic sensors and a processor. The plurality of magnetic sensors generate a plurality of detection values representing directions of a composite magnetic field, which is a composite of a magnetic field to be detected and a noise magnetic field. The processor assumes a group of estimated unknowns. The group of estimated unknowns is a set of estimated values of a first, a second, and a third unknown. The first unknown corresponds to an angle detection value. The second unknown corresponds to the direction of the noise magnetic field. The third unknown corresponds to the strength of the noise magnetic field. The processor executes a process for determining the group of estimated unknowns a plurality of times, and assumes an estimated value of the first unknown in the last determined group of estimated unknowns as the angle detection value.

8 Claims, 7 Drawing Sheets

ANGLE SENSOR AND ANGLE SENSOR SYSTEM

BACKGROUND OF THE INVENTION

1. Field of the Invention

The present invention relates to an angle sensor and an angle sensor system for generating an angle detection value having a correspondence with an angle to be detected.

2. Description of the Related Art

In recent years, angle sensors have been widely used in various applications, such as detection of the rotational position of a steering wheel or a power steering motor in an automobile. The angle sensors generate an angle detection value having a correspondence with an angle to be detected. Examples of the angle sensors include a magnetic angle sensor. An angle sensor system using a magnetic angle sensor is typically provided with a magnetic field generator for generating a magnetic field to be detected, the direction of which rotates in response to the rotation or linear movement of an object. Hereinafter, a magnetic field to be detected will be referred to as a detection-target magnetic field. The magnetic field generator is a magnet, for example. An example of angles to be detected by the magnetic angle sensor is an angle corresponding to the rotational position of the magnet. For example, the magnetic angle sensor detects a detection-target magnetic field and generates, as the angle detection value, a value representing the angle that the direction of the detection-target magnetic field at a reference position forms with respect to a reference direction in a reference plane.

A type of magnetic angle sensor is known that includes two detection circuits for generating two detection signals different in phase from each other, and generates an angle detection value by performing arithmetic processing using the two detection signals. In such a magnetic angle sensor, each of the two detection circuits may be subjected not only to a detection-target magnetic field but also to a noise magnetic field other than the detection-target magnetic field. Examples of the noise magnetic field include the earth's magnetic field and a leakage magnetic field from a motor. When subjected to such a noise magnetic field, each of the two detection circuits detects a composite magnetic field of the detection-target magnetic field and the noise magnetic field. When the detection-target magnetic field and the noise magnetic field are in different directions, some error occurs in the angle detection value. The error occurring in the angle detection value will hereinafter be referred to as angle error.

US 2018/0164127 A1 and US 2018/0274896 A1 describe angle sensors that are capable of reducing the angle error caused by the noise magnetic field.

The angle sensor described in US 2018/0164127 A1 includes a plurality of composite magnetic field information generation units and an angle computing unit. The plurality of composite magnetic field information generation units detect the composite magnetic field at a plurality of detection positions different from each other, and generate a plurality of pieces of composite magnetic field information. Each of the plurality of pieces of composite magnetic field information includes information on either the direction or both of the direction and strength of the composite magnetic field. The angle computing unit generates an angle detection value by a least squares method on the basis of the plurality of pieces of composite magnetic field information.

The angle sensor described in US 2018/0274896 A1 includes a plurality of detection units for detecting the composite magnetic field at a plurality of detection positions different from each other, and an angle computing unit for generating an angle detection value. Each of the plurality of detection units includes a first detection signal generation unit for generating a first detection signal representing the strength of a component in a first direction of the composite magnetic field, and a second detection signal generation unit for generating a second detection signal representing the strength of a component in a second direction of the composite magnetic field. The angle computing unit generates the angle detection value by a least squares method on the basis of a plurality of pairs of first and second detection signals generated at the plurality of detection units.

If the strengths and directions of the composite magnetic field at a plurality of detection positions can be represented by linear model functions using unknowns corresponding to the angle detection value and unknowns corresponding to the noise magnetic field as variables, the angle detection value can be generated by using a least squares method, like the technique described in US 2018/0164127 A1 and US 2018/0274896 A1.

For some angle sensor systems, however, the strengths and directions of the composite magnetic field at a plurality of detection positions may not be appropriate to be represented by linear model functions in the above-described manner. An example of such angle sensor systems is an angle sensor system that detects a detection-target magnetic field generated by a rotating magnet and generates an angle detection value having a correspondence with an angle corresponding to the rotational position of the magnet. The angle corresponding to the rotational position of the magnet is the angle to be detected by the angle sensor system. The angle detection value has a correspondence with the angle to be detected. If the strengths and directions of the composite magnetic field at a plurality of detection positions are not appropriate to be represented by linear model functions, the methods described in US 2018/0164127 A1 and US 2018/0274896 A1 could not generate a highly-accurate angle detection value with reduced angle error caused by the noise magnetic field.

SUMMARY OF THE INVENTION

It is an object of the present invention to provide an angle sensor and an angle sensor system for detecting a magnetic field to be detected whose direction changes with an angle to be detected, and generating an angle detection value having a correspondence with the angle to be detected, the angle sensor and the angle sensor system being capable of generating the angle detection value with high accuracy and with reduced angle error caused by a noise magnetic field.

An angle sensor of the present invention is configured to generate an angle detection value having a correspondence with an angle to be detected. The angle sensor includes a plurality of magnetic sensors and a processor. The plurality of magnetic sensors detect a composite magnetic field at a plurality of detection positions different from each other and generate a plurality of detection values that represent directions of the composite magnetic field, the composite magnetic field being a composite of a magnetic field to be detected and a noise magnetic field other than the magnetic field to be detected. The processor generates the angle detection value.

At the plurality of detection positions, directions of the magnetic field to be detected change with the angle to be detected. Manners in which either the directions or strengths, or both of the directions and strengths of the magnetic field to be detected change with the angle to be detected vary among the plurality of detection positions.

The processor assumes a group of unknowns, a group of provisional unknowns, and a group of estimated unknowns. The group of unknowns is a set of a first unknown, a second unknown, and a third unknown. The first unknown is a value corresponding to the angle detection value. The second unknown is a value corresponding to a direction of the noise magnetic field. The third unknown is a value corresponding to a strength of the noise magnetic field. The group of provisional unknowns is a set of provisional values of the first to third unknowns. The group of estimated unknowns is a set of estimated values of the first to third unknowns.

The processor executes a first process and a second process so that the number of executions of the first process is two or more, the first process being a process for determining the group of estimated unknowns on the basis of the plurality of detection values and the group of provisional unknowns, the second process being a process for assuming the group of estimated unknowns determined by the first process as a new group of provisional unknowns for the first process to be executed next time. The processor further executes a third process for assuming an estimated value of the first unknown in the group of estimated unknowns determined by the last executed first process as the angle detection value.

In the angle sensor of the present invention, the processor may further assume approximate functions, the approximate functions being first derivatives of model functions representing the plurality of detection values with the group of unknowns as variables. In such a case, the first process may determine the group of estimated unknowns on the basis of the plurality of detection values, the group of provisional unknowns, and the approximate functions.

The processor may further assume a plurality of temporary detection values, a plurality of discrepancy values, a group of change amounts, and a group of approximate discrepancy values. The plurality of temporary detection values are values in the group of provisional unknowns in the model functions. The plurality of discrepancy values are differences between corresponding ones of the plurality of detection values and the plurality of temporary detection values. The group of change amounts is a set of change amounts of the estimated values of the first to third unknowns in the group of estimated unknowns with respect to the provisional values of the first to third unknowns in the group of provisional unknowns. The group of approximate discrepancy values is a set of a plurality of approximate discrepancy values corresponding to the plurality of discrepancy values, and is determined from the approximate functions and the group of change amounts. The first process may determine the group of change amounts so that the group of approximate discrepancy values becomes a set of approximate values to the plurality of discrepancy values, and may further determine the group of estimated unknowns on the basis of the group of change amounts thus determined. The first process may determine the group of change amounts so that a sum of squares of differences between corresponding ones of the plurality of discrepancy values and the plurality of approximate discrepancy values is minimized. The third process may be executed if the change amount of the estimated value of the first unknown in the group of change amounts is smaller than or equal to a predetermined value.

The model functions may be nonlinear functions including a plurality of periodic functions with the first unknown as a variable.

In the angle sensor of the present invention, each of the plurality of magnetic sensors may include a first signal generator for generating a first signal, a second signal generator for generating a second signal, and a computing circuit for generating a corresponding one of the plurality of detection values on the basis of the first and second signals. The first signal has a correspondence with the cosine of an angle that the direction of the composite magnetic field forms with respect to a reference direction. The second signal has a correspondence with the sine of the angle that the direction of the composite magnetic field forms with respect to the reference direction. In such a case, the corresponding one of the plurality of detection values may represent the angle that the direction of the composite magnetic field forms with respect to the reference direction. Each of the first and second signal generators may include at least one magnetic detection element.

An angle sensor system of the present invention includes the angle sensor of the present invention and a magnetic field generator for generating the magnetic field to be detected. In the angle sensor system of the present invention, a relative position of the magnetic field generator with respect to the plurality of detection positions may be variable. The angle to be detected may have a correspondence with the relative position of the magnetic field generator.

According to the angle sensor and the angle sensor system of the present invention, the first to third processes are executed so that the number of executions of the first process is two or more. This makes it possible to generate a highly-accurate angle detection value with reduced angle error caused by a noise magnetic field.

Other and further objects, features and advantages of the present invention will appear more fully from the following description.

DETAILED DESCRIPTION OF THE PREFERRED EMBODIMENT

A preferred embodiment of the present invention will now be described in detail with reference to the drawings. First, reference is made to FIG. 1 to describe a schematic configuration of an angle sensor system according to the embodiment of the invention. The angle sensor system 100 according to the embodiment includes an angle sensor 1 according to the embodiment and a magnetic field generator 5. The angle sensor 1 is a magnetic angle sensor, in particular. The magnetic field generator 5 generates a magnetic field to be detected, which is a magnetic field originally intended to be detected by the angle sensor 1, and which will hereinafter be referred to as a detection-target magnetic field.

Figure 1:
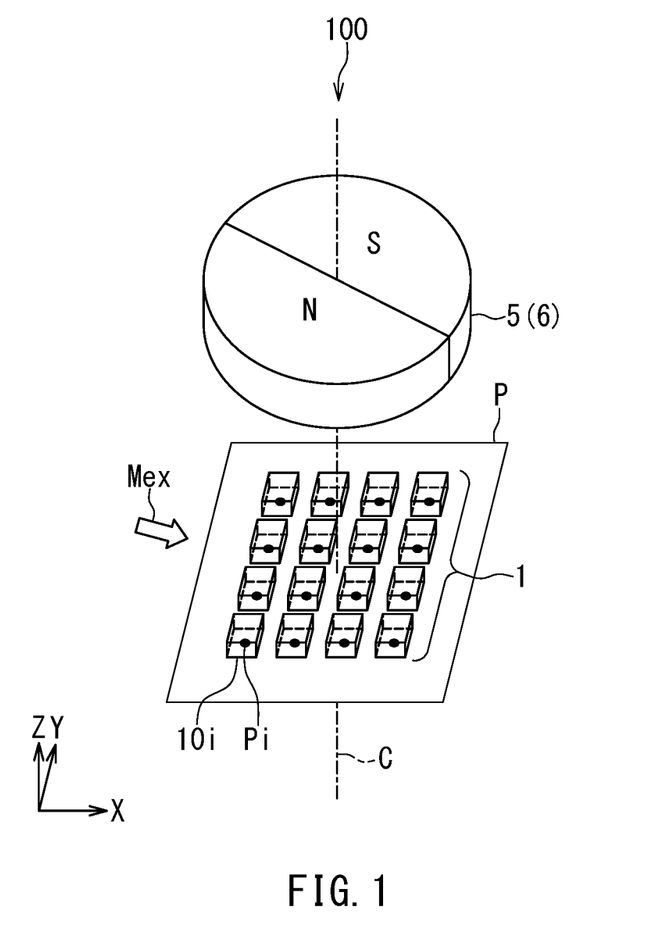
FIG. 1 is a perspective view showing a schematic configuration of an angle sensor system according to an embodiment of the invention.

The magnetic field generator 5 in the embodiment is a magnet 6 of a cylindrical shape having a central axis. The magnet 6 has an N pole and an S pole that are arranged symmetrically with respect to an imaginary plane including the aforementioned central axis. The magnet 6 rotates around the central axis. This causes the direction of the detection-target magnetic field generated by the magnet 6 to rotate around a center of rotation C including the central axis.

The angle sensor 1 is configured to detect the detection-target magnetic field and generate an angle detection value $\theta s$ having a correspondence with an angle to be detected. Hereinafter, the angle to be detected will be referred to as detection-target angle, and denoted by a symbol $\theta$. The detection-target angle $\theta$ in the present embodiment is an angle corresponding to the rotational position of the magnet 6.

The angle sensor 1 includes a plurality of magnetic sensors. The plurality of magnetic sensors detect a composite magnetic field at a plurality of detection positions different from each other, and generate a plurality of detection values that represent the directions of the composite magnetic field. The composite magnetic field is a composite of the detection-target magnetic field and a noise magnetic field Mex other than the detection-target magnetic field. At the plurality of detection positions, the directions of the detection-target magnetic field change with the detection-target angle $\theta$. Manners in which either the directions or strengths, or both of the directions and strengths of the detection-target magnetic field change with the detection-target angle $\theta$ vary among the plurality of detection positions.

The number of the detection positions may be three or more. The number of the detection positions will be represented by M (M is an integer greater than or equal to 3). In the present embodiment, a reference plane P is defined at each of the M detection positions. Alternatively, a reference plane P common to the M detection positions is defined. The reference plane P is an imaginary plane parallel to either one of the end faces of the magnet 6. The M detection positions are located in the respective corresponding reference planes P or in the common reference plane P. In the following description, the M detection positions are assumed to be located in the common reference plane P.

Directions of the noise magnetic field Mex at the M detection positions are identical. Strengths of the noise magnetic field Mex at the M detection positions are equal.

In the present embodiment, the plurality of magnetic sensors are M magnetic sensors. The M magnetic sensors are disposed to face the aforementioned one of the end faces of the magnet 6. Hereinafter, the M magnetic sensors will be referred to as the first to M-th magnetic sensors. An i-th magnetic sensor will be denoted by the symbol 10$i$, where i is any integer between 1 and M inclusive. The detection position corresponding to the magnetic sensor 10$i$ will be denoted by the symbol Pi. The reference direction corresponding to the magnetic sensor 10$i$ will be denoted by the symbol DRi. The detection value generated by the magnetic sensor 10$i$ will be denoted by the symbol $\theta si$. The magnetic sensor 10$i$ generates, as the detection value $\theta si$, a value having a correspondence with an angle $\theta di$ that the direction DMi of the detection-target magnetic field at the detection position Pi forms with respect to the reference direction DRi.

Figure 2:
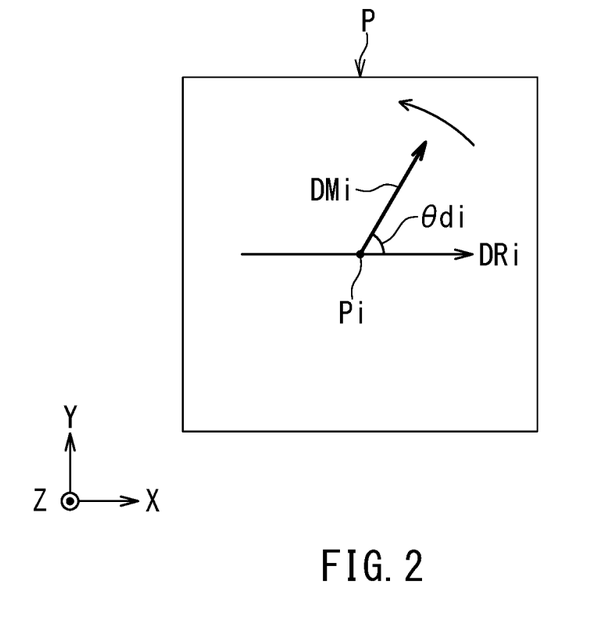
FIG. 2 is an explanatory diagram showing a reference plane in the embodiment of the invention.

Now, definitions of directions used in the present embodiment will be described with reference to FIG. 1 and FIG. 2. First, Z direction is defined as the direction parallel to the center of rotation C shown in FIG. 1 and from bottom to top in FIG. 1. FIG. 2 shows the Z direction as the direction out of the plane of the drawing. X and Y directions are defined as two mutually orthogonal directions perpendicular to the Z direction. FIG. 2 shows the X direction as the rightward direction, and the Y direction as the upward direction. Further, −X direction refers to the direction opposite to the X direction, and −Y direction refers to the direction opposite to the Y direction.

The reference direction DRi is in the reference plane P and intersects the detection position Pi. The direction DMi of the detection-target magnetic field at the detection position Pi is also in the reference plane P. In the present embodiment, the reference direction DRi is the X direction. In the reference plane P the direction DMi of the detection-target magnetic field rotates around the detection position Pi. In the present embodiment, it is assumed that the direction DMi of the detection-target magnetic field rotates counterclockwise in FIG. 2. The angle $\theta di$ is expressed in positive values when viewed in the counterclockwise direction from the reference direction DRi, and in negative values when viewed in the clockwise direction from the reference direction DRi.

In the present embodiment, the angle $\theta di$ is equal to the detection-target angle $\theta$ if the magnet 6 generates an ideal detection-target magnetic field. However, the angle $\theta di$ is not always ideal and may slightly differ from the detection-target angle $\theta$ due to uneven magnetization of the magnet 6 or other factors.

In situations where there exists a noise magnetic field Mex, the magnetic sensor 10$i$ detects a composite magnetic field at the detection position Pi, the composite magnetic field being a composite of the detection-target magnetic field and the noise magnetic field Mex, and generates a detection value $\theta si$ representing the direction of the composite magnetic field. An angle that the direction of the composite magnetic field detected by the magnetic sensor 10$i$ forms with respect to the reference direction DRi will be denoted by the symbol $\theta i$. The positive and negative signs of the angle $\theta i$ are defined in the same manner as those of the angle $\theta di$.

Possible configurations of the angle sensor system 100 according to the present embodiment are not limited to the example shown in FIG. 1. The angle sensor system 100 according to the present embodiment need only be configured so that the relative position of the magnetic field generator 5 with respect to the plurality of detection positions varies. For example, the magnet 6 and the angle sensor 1 arranged as shown in FIG. 1 may be configured so that: the angle sensor 1 rotates while the magnet 6 is fixed; the magnet 6 and the angle sensor 1 rotate in mutually opposite directions; or the magnet 6 and the angle sensor 1 rotate in the same direction with mutually different angular velocities. In all cases, the detection-target angle θ has a correspondence with the relative position of the magnetic field generator 5.

Figure 3:
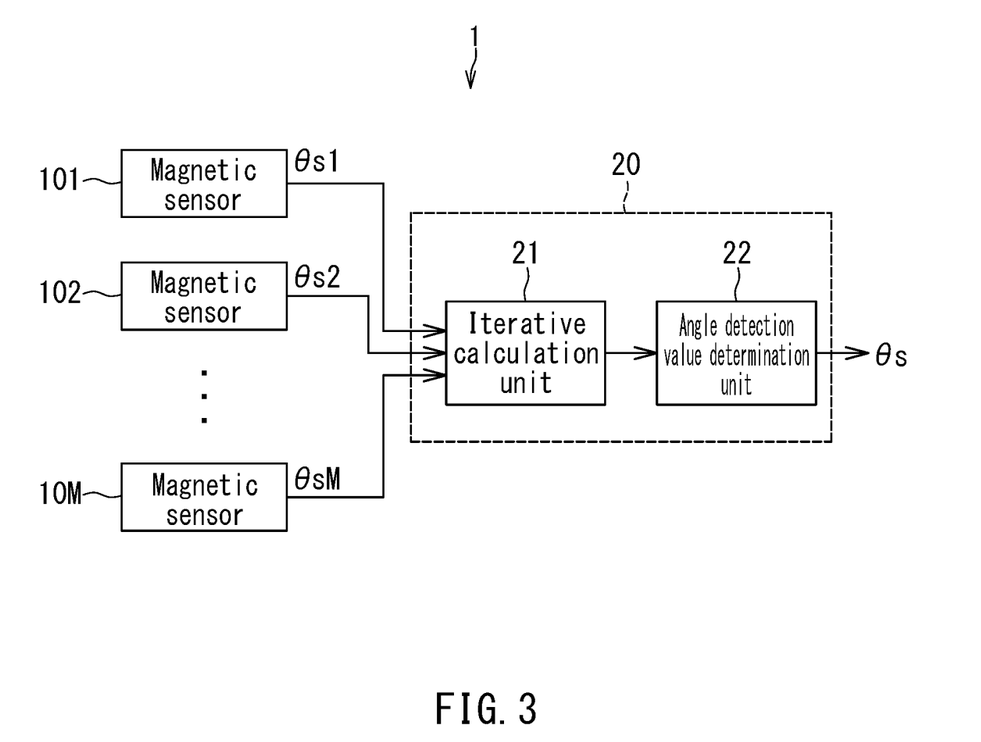
FIG. 3 is a functional block diagram showing the configuration of an angle sensor according to the embodiment of the invention.
Figure 4:
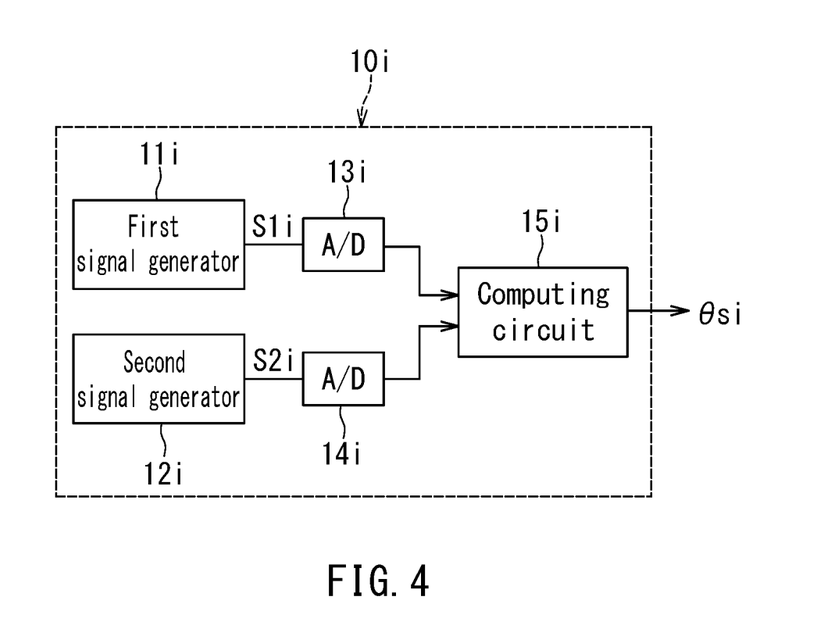
FIG. 4 is a functional block diagram showing an example configuration of a magnetic sensor in the embodiment of the invention.

Reference is now made to FIGS. 1, 3 and 4 to describe the configuration of the angle sensor 1 in detail. FIG. 3 is a functional block diagram showing the configuration of the angle sensor 1. FIG. 4 is a functional block diagram showing an example configuration of the magnetic sensor 10i. As described above, the angle sensor 1 according to the present embodiment includes M magnetic sensors 101, 102, . . . , and 10M.

In the example shown in FIG. 4, the magnetic sensor 10i includes a first signal generator 11i, a second signal generator 12i, analog-to-digital converters (hereinafter, "A/D converters") 13i and 14i, and a computing circuit 15i. The first signal generator 11i generates a first signal S1i having a correspondence with the cosine of the angle θi that the direction of the composite magnetic field at the detection position Pi forms with respect to the reference direction DRi. The second signal generator 12i generates a second signal S2i having a correspondence with the sine of the angle θi that the direction of the composite magnetic field at the detection position Pi forms with respect to the reference direction DRi. The A/D converters 13i and 14i convert the first signal S1i and the second signal S2i into digital form, respectively. The computing circuit 15i generates the detection value θsi on the basis of the first and second signals S1i and S2i converted into digital form by the A/D converters 13i and 14i, respectively. The detection value θsi represents the angle θi. The computing circuit 15i can be implemented by an application-specific integrated circuit (ASIC) or a microcomputer, for example.

Each of the first and second signal generators 11i and 12i includes at least one magnetic detection element. The at least one magnetic detection element may include at least one magnetoresistive element. The magnetoresistive element may be a giant magnetoresistive (GMR) element, a tunneling magnetoresistive (TMR) element, or an anisotropic magnetoresistive (AMR) element. The at least one magnetic detection element may include at least one other element than a magnetoresistive element, such as a Hall element, for detecting a magnetic field.

The angle sensor 1 further includes a processor 20 for generating the angle detection value θs. The angle detection value θs is generated on the basis of M detection values θs1, θs2, . . . , and θsM. The processor 20 can be implemented by an ASIC or a microcomputer, for example. A description will be given later as to the configuration of the processor 20 and how to generate the angle detection value θs.

Figure 5:
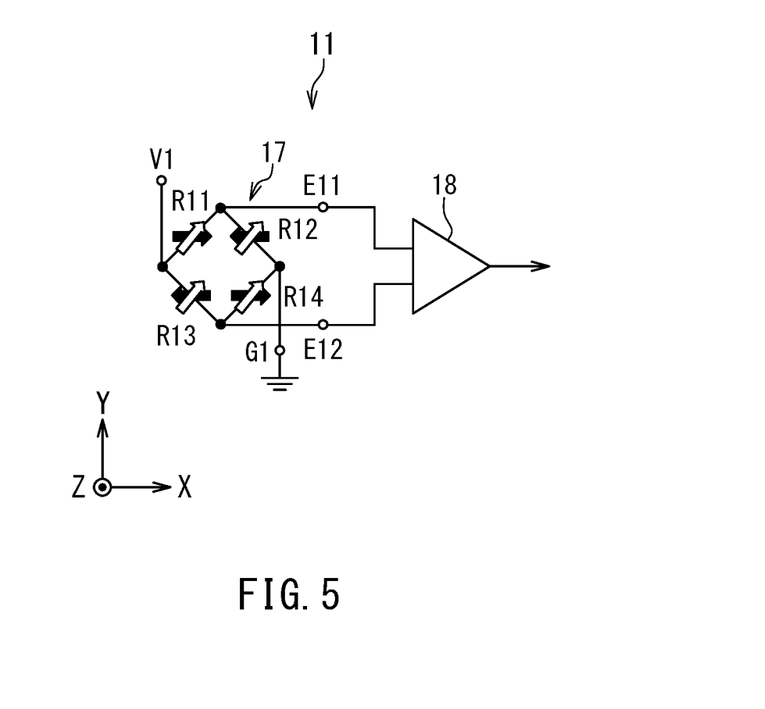
FIG. 5 is a circuit diagram showing an example configuration of a first signal generator in the embodiment of the invention.

The configuration of the first and second signal generators 11i and 12i will now be described. FIG. 5 shows a specific example of configuration of the first signal generator 11i. In this example, the first signal generator 11i includes a Wheatstone bridge circuit 17 and a difference detector 18. The Wheatstone bridge circuit 17 includes four magnetic detection elements R11, R12, R13 and R14, a power supply port V1, a ground port G1, and two output ports E11 and E12. The magnetic detection element R11 is provided between the power supply port V1 and the output port E11. The magnetic detection element R12 is provided between the output port E11 and the ground port G1. The magnetic detection element R13 is provided between the power supply port V1 and the output port E12. The magnetic detection element R14 is provided between the output port E12 and the ground port G1. A power supply voltage of predetermined magnitude is applied to the power supply port V1. The ground port G1 is connected to the ground.

Figure 6:
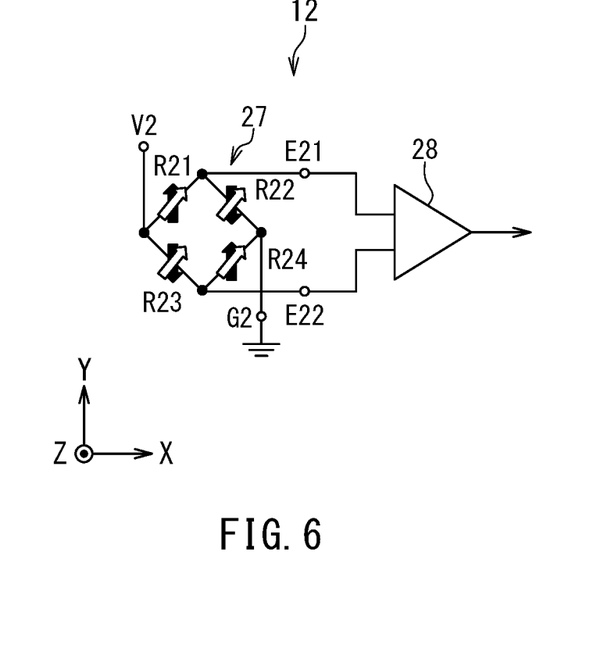
FIG. 6 is a circuit diagram showing an example configuration of a second signal generator in the embodiment of the invention.

FIG. 6 shows a specific example of configuration of the second signal generator 12i. In this example, the second signal generator 12i includes a Wheatstone bridge circuit 27 and a difference detector 28. The Wheatstone bridge circuit 27 includes four magnetic detection elements R21, R22, R23 and R24, a power supply port V2, a ground port G2, and two output ports E21 and E22. The magnetic detection element R21 is provided between the power supply port V2 and the output port E21. The magnetic detection element R22 is provided between the output port E21 and the ground port G2. The magnetic detection element R23 is provided between the power supply port V2 and the output port E22. The magnetic detection element R24 is provided between the output port E22 and the ground port G2. A power supply voltage of predetermined magnitude is applied to the power supply port V2. The ground port G2 is connected to the ground.

In the present embodiment, each of the magnetic detection elements R11 to R14 and R21 to R24 includes a plurality of magnetoresistive (MR) elements connected in series. Each of the plurality of MR elements is a spin-valve MR element, for example. The spin-valve MR element includes a magnetization pinned layer whose magnetization direction is pinned, a free layer which is a magnetic layer whose magnetization direction changes with the direction of the detection-target magnetic field, and a nonmagnetic layer located between the magnetization pinned layer and the free layer. The spin-valve MR element may be a TMR element or a GMR element. In the TMR element, the nonmagnetic layer is a tunnel barrier layer. In the GMR element, the nonmagnetic layer is a nonmagnetic conductive layer. The resistance of the spin-valve MR element changes with the angle that the magnetization direction of the free layer forms with respect to the magnetization direction of the magnetization pinned layer. The resistance of the spin-valve MR element is at its minimum value when the foregoing angle is 0°, and at its maximum value when the foregoing angle is 180°. In FIG. 5 and FIG. 6, the filled arrows indicate the magnetization directions of the magnetization pinned layers of the MR elements, and the hollow arrows indicate the magnetization directions of the free layers of the MR elements.

In the first signal generator 11i, the magnetization pinned layers of the MR elements included in the magnetic detection elements R11 and R14 are magnetized in the X direction, and the magnetization pinned layers of the MR elements included in the magnetic detection elements R12 and R13 are magnetized in the −X direction. In this case, the potential difference between the output ports E11 and E12 changes with the cosine of the angle θi that the direction of the composite magnetic field at the detection position Pi forms with respect to the reference direction DRi. The difference detector 18 outputs a signal corresponding to the potential difference between the output ports E11 and E12 as the first signal S1i. The first signal S1i thus has a correspondence with the cosine of the angle θi.

In the second signal generator 12i, the magnetization pinned layers of the MR elements included in the magnetic detection elements R21 and R24 are magnetized in the Y direction, and the magnetization pinned layers of the MR elements included in the magnetic detection elements R22 and R23 are magnetized in the −Y direction. In this case, the potential difference between the output ports E21 and E22 changes with the sine of the angle θi that the direction of the composite magnetic field at the detection position Pi forms with respect to the reference direction DRi. The difference detector 28 outputs a signal corresponding to the potential difference between the output ports E21 and E22 as the second signal S2i. The second signal S2i thus has a correspondence with the sine of the angle θi.

In the light of the production accuracy of the MR elements and other factors, the magnetization directions of the magnetization pinned layers of the MR elements in the signal generators 11i and 12i may be slightly different from the above-described directions.

Figure 7:
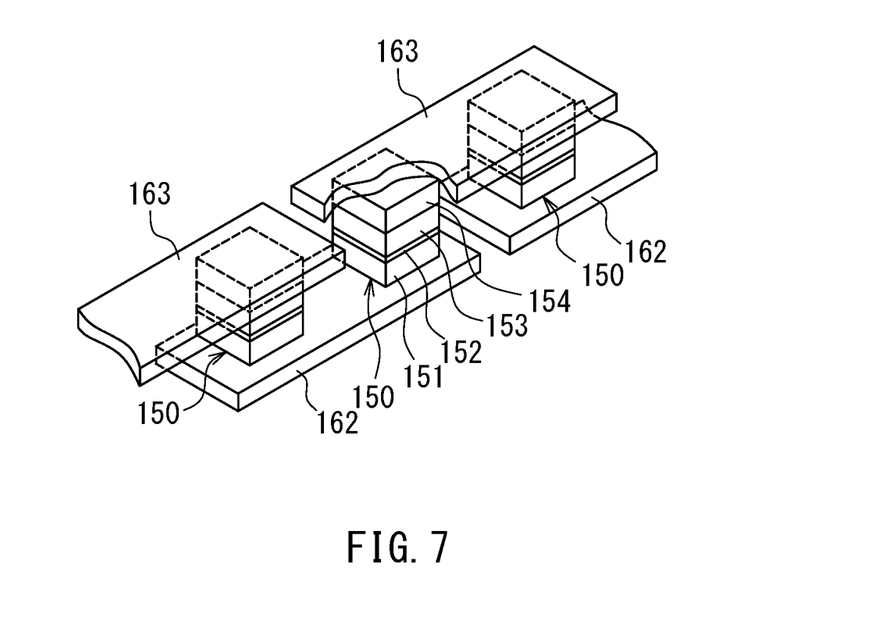
FIG. 7 is a perspective view of part of a magnetic detection element in FIG. 5 and FIG. 6.

An example configuration of the magnetic detection elements will now be described with reference to FIG. 7. FIG. 7 is a perspective view of part of a magnetic detection element in the signal generators 11i and 12i shown in FIG. 5 and FIG. 6. In this example, the magnetic detection element includes a plurality of lower electrodes 162, a plurality of MR elements 150, and a plurality of upper electrodes 163. The lower electrodes 162 are arranged on a substrate (not shown). The lower electrodes 162 each have a long slender shape. Every two lower electrodes 162 that are adjacent to each other in the longitudinal direction of the lower electrodes 162 have a gap therebetween. As shown in FIG. 7, MR elements 150 are provided on the top surface of the lower electrode 162 at positions near opposite ends in the longitudinal direction. Each MR element 150 includes a free layer 151, a nonmagnetic layer 152, a magnetization pinned layer 153, and an antiferromagnetic layer 154 which are stacked in this order, from closest to farthest from the lower electrode 162. The free layer 151 is electrically connected to the lower electrode 162. The antiferromagnetic layer 154 is formed of an antiferromagnetic material, and is in exchange coupling with the magnetization pinned layer 153 to thereby pin the magnetization direction of the magnetization pinned layer 153. The upper electrodes 163 are arranged over the MR elements 150. Each upper electrode 163 has a long slender shape, and establishes electrical connection between the respective antiferromagnetic layers 154 of two adjacent MR elements 150 that are arranged on two lower electrodes 162 adjacent in the longitudinal direction of the lower electrodes 162. With such a configuration, the MR elements 150 in the magnetic detection element shown in FIG. 7 are connected in series by the upper electrodes 163 and lower electrodes 162. It should be appreciated that the layers 151 to 154 of the MR elements 150 may be stacked in the reverse order to that shown in FIG. 7.

Next, a method for generating the detection value θsi will be described concretely. The computing circuit 15i determines θsi in accordance with Eq. (1) below.

$$\theta si = \operatorname{atan}(S2i/S1i) \tag{1}$$

Note that "atan" represents an arctangent.

For θsi ranging from 0° to less than 360°, Eq. (1) yields two solutions of θsi that are 180° different in value. Which of the two solutions of θsi in Eq. (1) is the true value of θsi can be determined in accordance with the combination of the signs of S1i and S2i. The computing circuit 15i determines θsi within the range of 0° to less than 360° in accordance with Eq. (1) and the determination on the combination of the signs of S1i and S2i.

Figure 8:
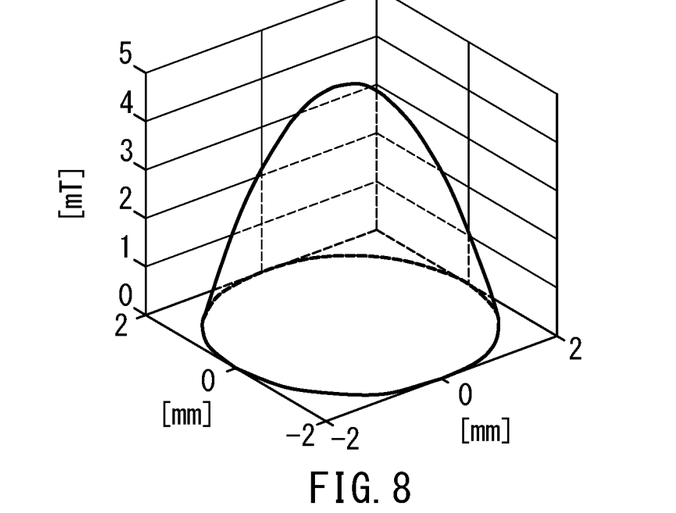
FIG. 8 is an explanatory diagram schematically showing a distribution of strengths of a magnetic field to be detected that is generated by a magnetic field generator in the embodiment of the invention.

A method for generating the angle detection value θs will now be described. To begin with, a description will be given of the strength and direction of the detection-target magnetic field. In the present embodiment, a magnetic field whose strength decreases with increasing distance from the center of rotation C (see FIG. 1) in the reference plane P is assumed as the detection-target magnetic field generated by the magnetic field generator 5. FIG. 8 is an explanatory diagram schematically showing the distribution of strengths of the detection-target magnetic field. The vertical axis in FIG. 8 represents the strength of the detection-target magnetic field (in units of mT). In FIG. 8, two axes orthogonal to the vertical axis represent positions (in units of mm) in two orthogonal directions in the reference plane P. In FIG. 8, an intersection point of the reference plane P and the center of rotation C (see FIG. 1) is set at an origin point of the two axes orthogonal to the vertical axis.

Figure 9:
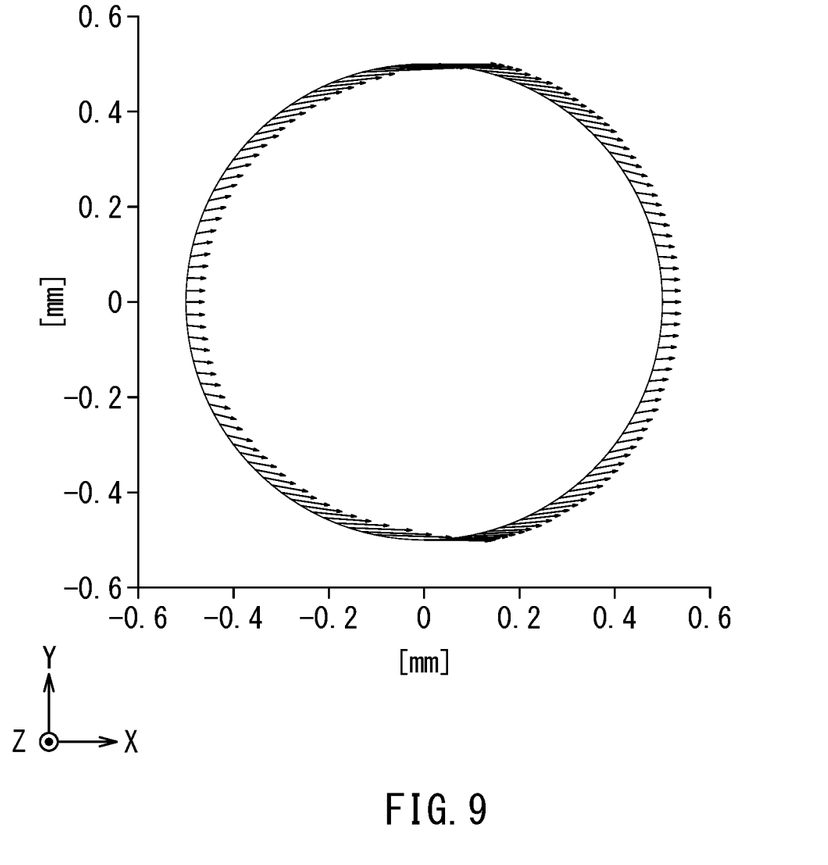
FIG. 9 is an explanatory diagram schematically showing a distribution of strengths and directions of the magnetic field to be detected that is generated by the magnetic field generator in the embodiment of the invention.

FIG. 9 is an explanatory diagram schematically showing the distribution of the strengths and directions of the detection-target magnetic field in the reference plane P. In FIG. 9, the intersection point of the reference plane P and the center of rotation C (see FIG. 1) is set at an origin point. In FIG. 9, each axis is in units of mm. The arrows in FIG. 9 represent the strengths and directions of the detection-target magnetic field at a plurality of points on the circumference of an imaginary circle centered on the origin point when the detection-target angle θ is 0°. The length of each arrow represents the strength of the detection-target magnetic field, and the direction of each arrow represents the direction of the detection-target magnetic field.

As shown in FIG. 8, the strength of the detection-target magnetic field in the reference plane P varies depending on the distance from the center of rotation C. As shown in FIG. 9, the strengths of the detection-target magnetic field at a plurality of positions located at equal distances from the center of rotation C in the reference plane P are almost the same but not exactly the same. In the area shown in FIG. 9 in the reference plane P, the directions of the detection-target magnetic field at a plurality of positions are almost the same but not exactly the same. If the detection-target angle θ changes at any position in the reference plane P, the strength and direction of the detection-target magnetic field at the position change depending on the detection-target angle θ.

In the present embodiment, in order to reproduce the strengths and directions of the detection-target magnetic field having the above-described characteristic as faithfully as possible, the strength Hdi and angle θdi (see FIG. 2) of the detection-target magnetic field at a detection position Pi are modeled by nonlinear functions including a plurality of periodic functions with the detection-target angle θ as a variable. Specific details of the modeling will be described below.

The strength Hdi of the detection-target magnetic field at the detection position Pi is expressed in Eq. (2) below. The right-hand side of Eq. (2) represents the function modeling the strength Hdi.

$$Hdi = Hd0 + \sum_{k=1}^{\infty} (A_{i\_k} \cos(k\theta) + B_{i\_k} \sin(k\theta)) \tag{2}$$

The angle θdi at the detection position Pi is expressed in Eq. (3) below. The right-hand side of Eq. (3) represents the function modeling the angle θdi.

$$\theta di = \theta d0 + \sum_{k=1}^{\infty} (C_{i\_k} \cos(k\theta) + D_{i\_k} \sin(k\theta)) \qquad (3)$$

In Eqs. (2) and (3), k is an integer greater than or equal to 1, and represents the order of the periodic function with the detection-target angle θ as a variable. Hd0 and θd0 are constants. $A_{i\_k}$, $B_{i\_k}$, $C_{i\_k}$, and $D_{i\_k}$ are constants each determined on the basis of i and k. In the example shown in FIG. 9, the function modeling the strength Hdi and the function modeling the angle θdi each include periodic functions with k of 2 in value.

The constants $A_{i\_k}$, $B_{i\_k}$, $C_{i\_k}$, and $D_{i\_k}$ are determined in advance before the use of the angle sensor system 100. For example, the constants $A_{i\_k}$, $B_{i\_k}$, $C_{i\_k}$, and $D_{i\_k}$ can be determined by determining the distributions of the strengths and directions of the detection-target magnetic field in the reference plane P by simulation, and analyzing the distributions. Suppose, for example, that the imaginary circle shown in FIG. 9 is one that passes through a certain detection position Pi. That the detection-target angle θ changes is equivalent to that the imaginary circle rotates. The constants $A_{i\_k}$, $B_{i\_k}$, $C_{i\_k}$, and $D_{i\_k}$ can therefore be determined by, for example, determining the distributions of the strengths and directions of the detection-target magnetic field on the circumference of the imaginary circle by simulation, and then analyzing the manners in which the strengths and directions of the detection-target magnetic field change on the circumference by the Fourier analysis or the like.

Now, the detection value θsi generated by the magnetic sensor 10*i* and a method for generating the angle detection value θs will be described in outline. When there is no noise magnetic field Mex, in theory, the detection value θsi is expressed in Eq. (4) below using the strength Hdi of the detection-target magnetic field, the cosine of the angle θdi, and the sine of the angle θdi.

$$\theta si = a\tan\left(\frac{Hdi \cdot \sin(\theta di)}{Hdi \cdot \cos(\theta di)}\right) \qquad (4)$$

Here, the strength of the noise magnetic field Mex will be denoted by the symbol $H_{EX}$, and the angle that the direction of the noise magnetic field Mex forms with respect to the reference direction DRi will be denoted by the symbol $\theta_{EX}$. When there exists the noise magnetic field Mex, in theory, the detection value θsi is expressed in Eq. (5) below.

$$\theta si = a\tan\left(\frac{Hdi \cdot \sin(\theta di) + H_{EX} \cdot \sin(\theta_{EX})}{Hdi \cdot \cos(\theta di) + H_{EX} \cdot \cos(\theta_{EX})}\right) \qquad (5)$$

The right-hand side of Eq. (5) represents a model function representing the detection value θsi. As described above, since Hdi and θdi both include a plurality of periodic functions with the detection-target angle θ as a variable, the model function is a nonlinear function including a plurality of periodic functions with the detection-target angle θ as a variable.

The model function on the right-hand side of Eq. (5) includes variables $H_{EX}$ and $\theta_{EX}$ in addition to the detection-target angle θ. Eq. (5) is a nonlinear equation with θ, $\theta_{EX}$, and $H_{EX}$ as variables. Eq. (5) is defined for each of the M magnetic sensors 10*i* having respective different values of i.

The M detection values θsi are thus expressed in M Eqs. (5) with respective different values of i.

The detection-target angle θ is not known. In the present embodiment, an unknown $\theta_{MA}$ corresponding to the detection-target angle θ is assumed. In the present embodiment, $\theta_{EX}$ and $H_{EX}$ are also unknowns. $\theta_{EX}$ and $H_{EX}$ will hereinafter be referred to as unknowns $\theta_{EX}$ and $H_{EX}$. Therefore, M Eqs. (5) with respective different values of i can be said to be M nonlinear equations with unknowns $\theta_{MA}$, $\theta_{EX}$, and $H_{EX}$ as variables.

The unknown $\theta_{MA}$ is a value corresponding to the angle detection value θs, and corresponds to the first unknown in the present invention. The unknown $\theta_{EX}$ is a value corresponding to the direction of the noise magnetic field Mex, and corresponds to the second unknown in the present invention. The unknown $H_{EX}$ is a value corresponding to the strength of the noise magnetic field Mex, and corresponds to the third unknown in the present invention.

In the present embodiment, an estimated value of the unknown $\theta_{MA}$ is determined by numerical calculation on the basis of the M nonlinear equations with the foregoing unknowns $\theta_{MA}$, $\theta_{EX}$, and $H_{EX}$ as variables, and the estimated value is assumed to be the angle detection value θs.

Next, a method for generating the angle detection value θs will be specifically described. A set of the unknowns $\theta_{MA}$, $\theta_{EX}$, and $H_{EX}$ will hereinafter be referred to as a group of unknowns and denoted by the symbol X. The right-hand side of Eq. (5) can be said to be a model function representing the detection value θsi with the group of unknowns X as variables. The model function is a nonlinear function including a plurality of periodic functions with the unknown $\theta_{MA}$ as a variable. The right-hand side of Eq. (5) will hereinafter be represented by θsi(X). θsi(X) is a function with $\theta_{MA}$, $\theta_{EX}$, and $H_{EX}$ as variables.

A value of the unknown $\theta_{MA}$ will be denoted by the symbol $P\theta_{MA}$. A value of the unknown $\theta_{EX}$ will be denoted by the symbol $P\theta_{EX}$. A value of the unknown $H_{EX}$ will be denoted by the symbol $PH_{EX}$. A set of $P\theta_{MA}$, $P\theta_{EX}$ and $PH_{EX}$ will be denoted by the symbol $X_P$. Modifying Eq. (5) by Taylor expansion up to the first order on the basis of $X_P$ yields the following approximate equation (6) expressing θsi(X).

$$\theta si(x) \simeq \theta si(X_P) + (\theta_{MA} - P\theta_{MA})\frac{\partial \theta si(X_P)}{\partial \theta_{MA}} + \qquad (6)$$
$$(\theta_{EX} - P\theta_{EX})\frac{\partial \theta si(X_P)}{\partial \theta_{EX}} + (H_{EX} - PH_{EX})\frac{\partial \theta si(X_P)}{\partial H_{EX}}$$

The first term on the right-hand side of Eq. (6), θsi($X_P$), represents the value of θsi(X) in $X_P$. θsi($X_P$) is a value obtained by substituting $P\theta_{MA}$, $P\theta_{EX}$, and $PH_{EX}$ into $\theta_{MA}$, $\theta_{EX}$, and $H_{EX}$ of θsi(X), respectively. θsi($X_P$) is an imaginary detection value. θsi($X_P$) will hereinafter be referred to as a temporary detection value and denoted by the symbol θei.

$\partial \theta si(X_P)/\partial \theta_{MA}$ in the second term on the right-hand side of Eq. (6) represents the value of a first derivative obtained by partially differentiating θsi(X) with respect to $\theta_{MA}$ in $X_P$. $\partial \theta si(X_P)/\partial \theta_{EX}$ in the third term on the right-hand side of Eq. (6) represents the value of a first derivative obtained by partially differentiating θsi(X) with respect to $\theta_{EX}$ in $X_P$. $\partial \theta si(X_P)/\partial H_{EX}$ in the fourth term on the right-hand side of Eq. (6) represents the value of a first derivative obtained by partially differentiating θsi(X) with respect to $H_{EX}$ in $X_P$.

The actual detection value θsi generated by the magnetic sensor 10*i* is also approximated by the right-hand side of Eq.

(6). Hence, consider an equation obtained by replacing the left-hand side of Eq. (6) with the detection value θsi. Then, define a difference between the actual detection value θsi and the temporary detection value θei as a discrepancy value Dθi. Subtracting the temporary detection value θei, i.e., θsi($X_P$) from both sides of the equation obtained by replacing the left-hand side of Eq. (6) with the detection value θsi yields the following approximate equation (7) expressing the discrepancy value Dθi.

$$D\theta i \cong (\theta_{MA} - P\theta_{MA})\frac{\partial \theta si(X_p)}{\partial \theta_{MA}} + \quad (7)$$
$$(\theta_{EX} - P\theta_{EX})\frac{\partial \theta si(X_p)}{\partial \theta_{EX}} + (H_{EX} - PH_{EX})\frac{\partial \theta si(X_p)}{\partial H_{EX}} =$$
$$\Delta\theta_{MA}\frac{\partial \theta si(X_p)}{\partial \theta_{MA}} + \Delta\theta_{EX}\frac{\partial \theta si(X_p)}{\partial \theta_{EX}} + \Delta H_{EX}\frac{\partial \theta si(X_p)}{\partial H_{EX}}$$

In Eq. (7), $\Delta\theta_{MA}$ represents $\theta_{MA}-P\theta_{MA}$, $\Delta\theta_{EX}$ represents $\theta_{EX}-P\theta_{EX}$, and $\Delta H_{EX}$ represents $H_{EX}-PH_{EX}$. Since $\theta_{MA}$, $\theta_{EX}$, and $H_{EX}$ are unknowns, $\Delta\theta_{MA}$, $\Delta\theta_{EX}$, and $\Delta H_{EX}$ are also unknowns. The right-hand side of Eq. (7) expresses an approximate discrepancy value that is a value equivalent to the discrepancy value Dθi.

In the present embodiment, approximate functions, which are first derivatives of the model functions representing the M detection values θs1, θs2, . . . , θsM with the group of unknowns X as variables, are assumed. The approximate functions are represented by an M-row three-column matrix H including, as its elements, the first derivatives of the model functions representing the M detection values θs1, θs2, . . . , θsM, i.e., the model functions θsi(X). An i-th row of the matrix H includes, as its elements, a first derivative obtained by partially differentiating θsi(X) with respect to $\theta_{MA}$, a first derivative obtained by partially differentiating θsi(X) with respect to $\theta_{EX}$, and a first derivative obtained by partially differentiating θsi(X) with respect to $H_{EX}$. All such first derivatives are functions with $\theta_{MA}$, $\theta_{EX}$, and $H_{EX}$ as variables. The matrix H is expressed in Eq. (8) below.

$$H = \begin{pmatrix} \frac{\partial \theta s1(X)}{\partial \theta_{MA}} & \frac{\partial \theta s1(X)}{\partial \theta_{EX}} & \frac{\partial \theta s1(X)}{\partial H_{EX}} \\ \frac{\partial \theta s2(X)}{\partial \theta_{MA}} & \frac{\partial \theta s2(X)}{\partial \theta_{EX}} & \frac{\partial \theta s2(X)}{\partial H_{EX}} \\ \vdots & \vdots & \vdots \\ \frac{\partial \theta sM(X)}{\partial \theta_{MA}} & \frac{\partial \theta sM(X)}{\partial \theta_{EX}} & \frac{\partial \theta sM(X)}{\partial H_{EX}} \end{pmatrix} \quad (8)$$

M approximate discrepancy values corresponding to M discrepancy values Dθ1, Dθ2, . . . , DθM are determined by calculating a product $H_P V_{DX}$ of a matrix $H_P$ and a three-dimensional column vector $V_{DX}$. The matrix $H_P$ is obtained by respectively substituting $PO_{MA}$, $PO_{EX}$, and $PH_{EX}$ into the variables $\theta_{MA}$, $\theta_{EX}$, and $H_{EX}$ in the first derivatives which are the elements of the matrix H. The three-dimensional column vector $V_{DX}$ includes $\Delta\theta_{MA}$, $\Delta\theta_{EX}$, and $\Delta H_{EX}$ as its elements. The vector $V_{DX}$ is expressed in Eq. (9) below.

$$V_{DX}^T = [\Delta\theta_{MA}, \Delta\theta_{EX}, \Delta H_{EX}] \quad (9)$$

In the present embodiment, approximate solutions to the unknowns $\Delta\theta_{MA}$, $\Delta\theta_{EX}$, and $\Delta H_{EX}$ are determined so that the M approximate discrepancy values become nearly equal to the corresponding ones of the M discrepancy values Dθ1, Dθ2, . . . , DθM. Specifically, in the present embodiment, the approximate solutions to the unknowns $\Delta\theta_{MA}$, $\Delta\theta_{EX}$, and $\Delta H_{EX}$ are determined so that the sum of the squares of differences between the corresponding ones of the M discrepancy values Dθ1, Dθ2, . . . , DθM and the M approximate discrepancy values is minimized. With the approximate solutions to the unknowns $\Delta\theta_{MA}$, $\Delta\theta_{EX}$, and $\Delta H_{EX}$ thus determined, estimated values of the unknowns $\theta_{MA}$, $\theta_{EX}$, and $H_{EX}$ are determined.

The estimated values of the unknowns $\theta_{MA}$, $\theta_{EX}$, and $H_{EX}$ are closer to the true values of the unknowns $\theta_{MA}$, $\theta_{EX}$, and $H_{EX}$ than $P\theta_{MA}$, $PO_{EX}$, and $PH_{EX}$, respectively. Here, assuming the set of the estimated values of the unknowns $\theta_{MA}$, $\theta_{EX}$ and $H_{EX}$ as a new $X_P$ and determining new approximate solutions to the unknowns $\Delta\theta_{MA}$, $\Delta\theta_{EX}$ and $\Delta H_{EX}$ on the basis of the new $X_P$ gives new estimated values of the unknowns $\theta_{MA}$, $\theta_{EX}$, and $H_{EX}$. The new estimated values are even closer to the true values. In the present embodiment, the processor 20 repeats the process for determining estimated values of the unknowns $\theta_{MA}$, $\theta_{EX}$, and $H_{EX}$ to bring the estimated values closer to the true values.

Now, the processes to be executed by the processor 20 will be described specifically with reference to FIG. 3. As shown in FIG. 3, the processor 20 includes an iterative calculation unit 21 and an angle detection value determination unit 22. The iterative calculation unit 21 and the angle detection value determination unit 22 are functional blocks constructed by the processor 20.

To generate the angle detection value θs, the processor 20 assumes the foregoing group of unknowns X, a group of provisional unknowns $X_{n-1}$, a group of estimated unknowns $X_n$, and a group of change amounts $EX_n$. The group of provisional unknown $X_{n-1}$ is a set of provisional values of the unknowns $\theta_{MA}$, $\theta_{EX}$, and $H_{EX}$. The group of estimated unknowns $X_n$ is a set of estimated values of the unknowns $\theta_{MA}$, $\theta_{EX}$, and $H_{EX}$. The provisional values of the unknowns $\theta_{MA}$, $\theta_{EX}$, and $H_{EX}$ will hereinafter be referred to as provisional values $A\theta_{MA}$, $A\theta_{EX}$, and $AH_{EX}$, respectively. The estimated values of the unknowns $\theta_{MA}$, $\theta_{EX}$, and $H_{EX}$ will be denoted by the symbols $B\theta_{MA}$, $B\theta_{EX}$, and $BH_{EX}$, respectively.

The group of change amounts $EX_n$ is a set of change amounts of the estimated values $B\theta_{MA}$, $B\theta_{EX}$, and $BH_{EX}$ with respect to the provisional values $A\theta_{MA}$, $A\theta_{EX}$, and $AH_{EX}$. The change amounts of the estimated values $B\theta_{MA}$, $B\theta_{EX}$, and $BH_{EX}$ will hereinafter be denoted by the symbols $E\theta_{MA}$, $E\theta_{EX}$, and $EH_{EX}$, respectively.

The processor 20 further assumes the foregoing approximate functions, i.e., the approximate functions represented by the matrix H, a plurality of temporary detection values θei, a plurality of discrepancy values Dθi, and a group of approximate discrepancy values Z. The first derivatives, which are the elements of the matrix H (see Eq. (8)), are determined in advance. The matrix H may be stored either in the iterative calculation unit 21 or in a storage unit (not shown) included in the processor 20. The plurality of temporary detection values θei that the processor 20 assumes are the values of θsi(X) in the group of provisional unknowns $X_{n-1}$. The temporary detection values θei are obtained by substituting the provisional values $A\theta_{MA}$, $A\theta_{EX}$, and $AH_{EX}$ into the variables $\theta_{MA}$, $\theta_{EX}$, and $H_{EX}$ in θsi(X), respectively. The plurality of discrepancy values Dθi are differences between corresponding ones of the plurality of detection values θsi and the plurality of temporary detection values θei.

The group of approximate discrepancy values Z is a set of a plurality of approximate discrepancy values corresponding to the plurality of discrepancy values Dθi, and is determined from the foregoing approximate functions represented by the matrix H and the group of change amounts $EX_n$. In the present embodiment, the plurality of approximate discrepancy values are M approximate discrepancy values z1, z2, ..., zM. The M approximate discrepancy values z1, z2, ..., zM are determined by calculating a product $H_{n-1}V_{EXn}$ of a matrix $H_{n-1}$ and a three-dimensional column vector $V_{EXn}$. The matrix $H_{n-1}$ is obtained by substituting the provisional values $A\theta_{MA}$, $A\theta_{EX}$, and $AH_{EX}$ into the variables $\theta_{MA}$, $\theta_{EX}$, and $H_{EX}$ in the first derivatives which are the elements of the matrix H. The three-dimensional column vector $V_{EXn}$ includes the change amounts $E\theta_{MA}$, $E\theta_{EX}$, and $EH_{EX}$ as its elements. The vector $V_{EXn}$ is expressed in Eq. (10) below.

$$V_{EXn}{}^T = [E\theta_{MA}, E\theta_{EX}, EH_{EX}] \quad (10)$$

To generate the angle detection value θs, the processor 20 executes a first process for determining the group of estimated unknowns $X_n$. In the present embodiment, the first process determines the group of estimated unknowns $X_n$ on the basis of the plurality of detection values θsi and the group of provisional unknowns $X_{n-1}$. In particular, in the present embodiment, the group of estimated unknowns $X_n$ is determined on the basis of the foregoing approximate functions in addition to the plurality of detection values θsi and the group of provisional unknowns $X_{n-1}$. The first process is executed by the iterative calculation unit 21 of the processor 20.

Now, the first process will be described concretely. In the first process, the iterative calculation unit 21 initially obtains the plurality of temporary detection values θei on the basis of the group of provisional unknowns $X_{n-1}$. The iterative calculation unit 21 then obtains the plurality of discrepancy values Dθi on the basis of the plurality of detection values θsi and the plurality of temporary detection values θei. The iterative calculation unit 21 then obtains the matrix $H_{n-1}$ on the basis of the group of provisional unknowns $X_{n-1}$.

Next, the iterative calculation unit 21 determines the group of change amounts $EX_n$ so that the group of approximate discrepancy values Z becomes a set of approximate values to the plurality of discrepancy values Dθi. Specifically, the processor 20 determines the group of change amounts $EX_n$ so that the sum of the squares of differences between the corresponding ones of the M discrepancy values Dθ1, Dθ2, ..., DθM and the M approximate discrepancy values z1, z2, ..., zM is minimized.

Here, an M-dimensional column vector that includes the M discrepancy values Dθ1, Dθ2, ..., DθM as its elements will be denoted by the symbol $V_Y$, and an M-dimensional column vector that includes the M approximate discrepancy values z1, z2, ..., zM as its elements will be denoted by the symbol $V_Z$. The vectors $V_Y$ and $V_Z$ are expressed in Eqs. (11) and (12) below, respectively.

$$V_Y{}^T = [D\theta 1, D\theta 2, \ldots, D\theta M] \quad (11)$$

$$V_Z{}^T = [z1, z2, \ldots, zM] \quad (12)$$

If the group of approximate discrepancy values Z is a set of approximate values to the M discrepancy values Dθ1, Dθ2, ..., DθM, then the vector $V_Z$ is approximately equal to the vector $V_Y$. The vector $V_Z$ is expressed as a product $H_{n-1}V_{EXn}$ of the matrix $H_{n-1}$ and the vector $V_{EXn}$. The vector $V_Y$ is therefore expressed in Eq. (13) below.

$$V_Y \approx H_{n-1}V_{EXn} \quad (13)$$

Specifically, the determination of the group of change amounts $EX_n$ is implemented by defining a least squares cost function F for determining the vector $V_{EXn}$ that minimizes the difference between the left- and right-hand sides of Eq. (13), and determining the vector $V_{EXn}$ that minimizes the value of the function F. The function F is defined as Eq. (14) below.

$$\begin{aligned} F &= \|V_Y - H_{N-1}V_{EXn}\|^2 \\ &= (V_Y - H_{N-1}V_{EXn})^T(V_Y - H_{N-1}V_{EXn}) \\ &= V_Y^T V_Y - V_{EXn}^T H_{n-1}^T V_Y - V_Y^T H_{n-1}V_{EXn} + \\ &\quad V_{EXn}^T H_{n-1}^T H_{n-1} V_{EXn} \end{aligned} \quad (14)$$

Partial differentiation of Eq. (14) with respect to $V_{EXn}$ yields Eq. (15) below.

$$\partial F/\partial V_{EXn} = 2(-H_{n-1}{}^T V_Y + H_{n-1}{}^T H_{n-1} V_{EXn}) \quad (15)$$

When $V_{EXn}$ minimizes the value of the function F, $\partial F/\partial V_{EXn} = 0$ is satisfied. Thus, $V_{EXn}$ that minimizes the value of the function F is expressed in Eq. (16) below.

$$V_{EXn} = (H_{n-1}{}^T H_{n-1})^{-1} H_{n-1}{}^T V_Y \quad (16)$$

In the present embodiment, the processor 20 determines a set of the three elements of the vector $V_{EXn}$ calculated in accordance with Eq. (16), i.e., a set of approximate solutions to the change amounts $E\theta_{MA}$, $E\theta_{EX}$ and $EH_{EX}$ as the group of change amounts $EX_n$.

In the first process, the iterative calculation unit 21 then determines the group of estimated unknowns $X_n$ on the basis of the determined group of change amounts $EX_n$. Here, a three-dimensional column vector that includes as its elements the provisional values $A\theta_{MA}$, $A\theta_{EX}$, and $AH_{EX}$ in the group of provisional unknowns $X_{n-1}$ will be denoted by the symbol and a three-dimensional column vector that includes as its elements the estimated values $B\theta_{MA}$, $B\theta_{EX}$, and $BH_{EX}$ in the group of estimated unknowns $X_n$ will be denoted by the symbol $V_n$. The vectors $V_{n-1}$ and $V_n$ are expressed in Eqs. (17) and (18) below, respectively.

$$V_{n-1}{}^T = [A\theta_{MA}, A\theta_{EX}, AH_{EX}] \quad (17)$$

$$V_n{}^T = [B\theta_{MA}, B\theta_{EX}, BH_{EX}] \quad (18)$$

The vector $V_n$ is expressed in the following Eq. (19) using the vector and the vector $V_{EXn}$.

$$V_n = V_{n-1} + V_{EXn} \quad (19)$$

The iterative calculation unit 21 determines a set of the three elements of the vector $V_n$ calculated in accordance with Eq. (19), i.e., a set of the estimated values $B\theta_{MA}$, $B\theta_{EX}$, and $BH_{EX}$ as the group of estimated unknowns $X_n$.

To generate the angle detection value θs, the processor 20 executes a second process and a third process in addition to the first process for determining the group of estimated unknowns $X_n$. The second process is a process for assuming the group of estimated unknowns $X_n$ determined by the first process as a new group of provisional unknowns $X_{n-1}$ for the first process to be executed next time. The second process is executed by the iterative calculation unit 21. The iterative calculation unit 21 executes the first process and the second process so that the number of executions of the first process is two or more.

Through the repetition of the first process, the estimated value $B\theta_{MA}$ approaches the true value of the first unknown $\theta_{MA}$. As the estimated value $B\theta_{MA}$ approaches the true value of the first unknown $\theta_{MA}$, the change amount $E\theta_{MA}$ in the group of change amounts $EX_n$ decreases. The third process is executed by the angle detection value determination unit 22 if the change amount $E\theta_{MA}$ is less than or equal to a predetermined value. The third process is a process for assuming the estimated value $B\theta_{MA}$ in the group of estimated unknowns $X_n$ determined by the last executed first process as the angle detection value $\theta s$.

Figure 10:
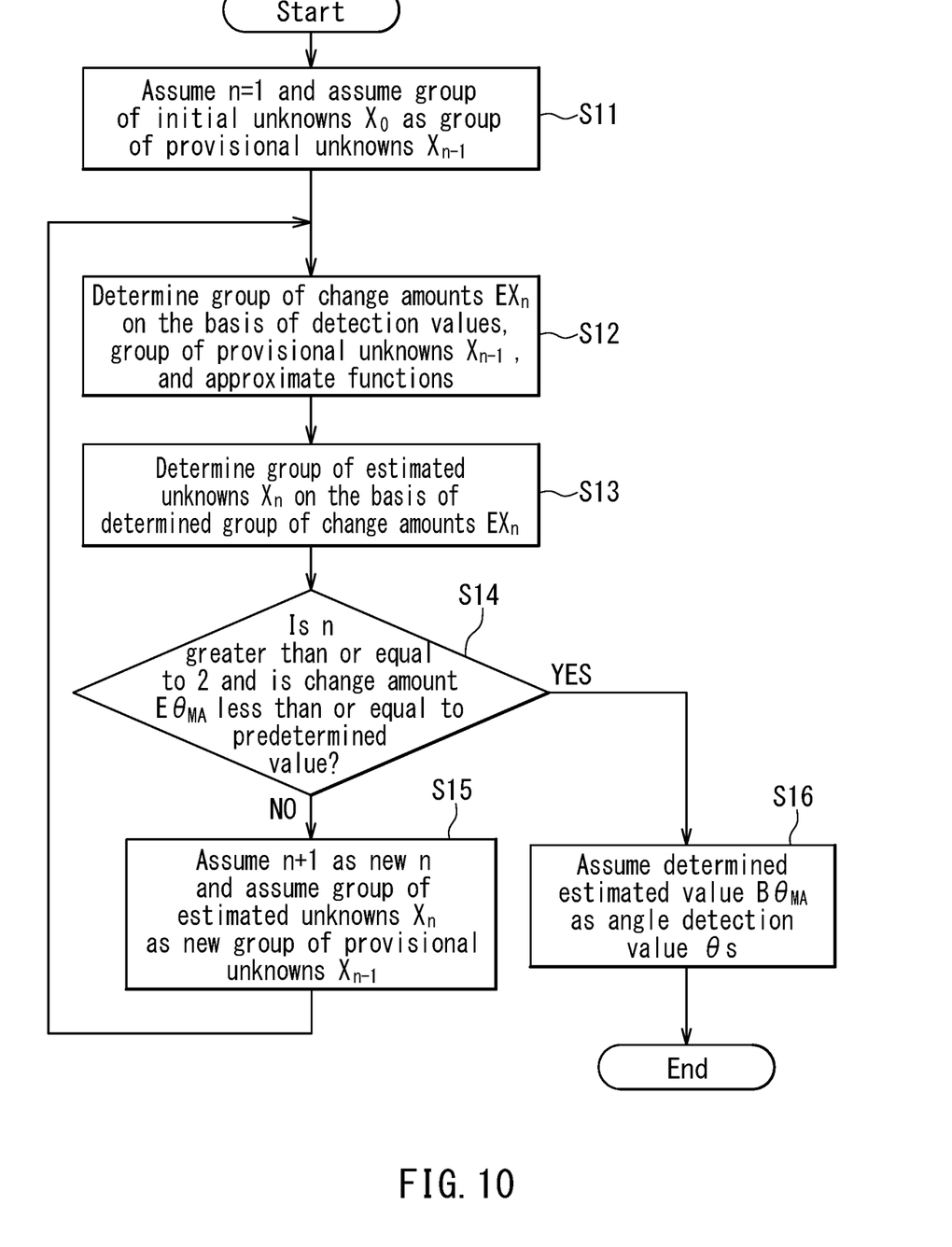
FIG. 10 is a flowchart of first to third processes in the embodiment of the invention.

Reference is now made to FIG. 10 to describe the relationship between the first to third processes. FIG. 10 is a flowchart of the method for generating the angle detection value $\theta s$.

In the method for generating the angle detection value $\theta s$, the iterative calculation unit 21 initially defines the variable n as an integer greater than or equal to 1, assumes n=1, and assumes a group of initial unknowns $X_0$ as the group of provisional unknowns $X_{n-1}$ (step S11). The group of initial unknowns $X_0$ is a set of initial values of the provisional values $A\theta_{MA}$, $A\theta_{EX}$, and $AH_{EX}$. The group of initial unknowns $X_0$ may be stored either in the iterative calculation unit 21 or in the storage unit (not shown) included in the processor 20.

The iterative calculation unit 21 then determines the group of change amounts $EX_n$ on the basis of the plurality of detection values $\theta si$, the group of provisional unknowns $X_{n-1}$, and the approximate functions represented by the matrix H (step S12). The iterative calculation unit 21 then determines the group of estimated unknowns $X_n$ on the basis of the determined group of change amounts $EX_n$ (step S13). The estimated values $B\theta_{MA}$, $B\theta_{EX}$, and $BH_{EX}$ are thereby determined.

Next, the iterative calculation unit 21 determines whether n is greater than or equal to 2 and the change amount $E\theta_{MA}$ is less than or equal to a predetermined value (step S14). If n is neither greater than nor equal to 2 and the change amount $E\theta_{MA}$ is neither less than nor equal to the predetermined value (NO), the iterative calculation unit 21 assumes n+1 as new n and assumes the group of estimated unknowns $X_n$ as a new group of provisional unknowns $X_{n-1}$ (step S15), and the flow returns to step S12.

In step S14, if n is greater than or equal to 2 and the change amount $E\theta_{MA}$ is less than or equal to the predetermined value (YES), the angle detection value determination unit 22 assumes the estimated value $B\theta_{MA}$ determined in step S13 as the angle detection value $\theta s$ (step S16).

Steps S12 and S13 correspond to the first process. Step S15 corresponds to the second process. Step S16 corresponds to the third process.

Next, the operation and effect of the angle sensor 1 and the angle sensor system 100 according to the present embodiment will be described. In the present embodiment, the processor 20 executes the foregoing first and second processes so that the number of executions of the first process is two or more, and executes the third process for assuming the estimated value $B\theta_{MA}$ determined by the last executed first process as the angle detection value $\theta s$.

In the present embodiment, the strength and direction of the detection-target magnetic field at any position in the reference plane P change depending on the detection-target angle $\theta$. In the present embodiment, in order to reproduce the strengths and directions of the detection-target magnetic field having such a characteristic as faithfully as possible, the strength Hdi and angle $\theta di$ of the detection-target magnetic field at a detection position Pi are modeled by nonlinear functions including a plurality of periodic functions with the detection-target angle $\theta$ as a variable, as expressed in the foregoing Eqs. (2) and (3), and the detection value $\theta si$ is represented by a nonlinear model function as expressed in the foregoing Eq. (5).

An example of methods for generating an angle detection value $\theta s$ in the presence of a noise magnetic field Mex is to estimate the angle detection value $\theta s$ by a single process using the least squares method on the basis of a plurality of detection values $\theta si$. However, if the strength Hdi and angle $\theta di$ of the detection-target magnetic field at a detection position Pi are represented by nonlinear functions as described above, it is not possible to accurately determine the angle detection value $\theta s$ with the single process using the least squares method.

In contrast, according to the present embodiment, as has been described with reference to Eqs. (6) to (8), the foregoing approximate functions, i.e., the approximate functions represented by the matrix H are determined in advance by using Taylor expansion up to the first order, and the first process is executed repeatedly in order to generate the angle detection value $\theta s$. The first process includes determining the group of change amounts $EX_n$ by using the plurality of discrepancy values $D\theta i$ obtained from the plurality of detection values $\theta si$ and the matrix $H_{n-1}$ obtained from the matrix H, and determining the estimated values $B\theta_{MA}$, $B\theta_{EX}$, and $BH_{EX}$ on the basis of the determined group of change amounts $EX_n$.

In the present embodiment, each time the number of executions of the first process increases, the discrepancy values $D\theta i$ and approximate discrepancy values corresponding to the discrepancy values $D\theta i$ become smaller. Also, the change amounts $E\theta_{MA}$, $E\theta_{EX}$, and $EH_{EX}$ in the group of change amounts $EX_n$ having a correspondence with the group of approximate discrepancy values Z which is a set of the approximate discrepancy values become smaller, so that the estimated values $B\theta_{MA}$, $B\theta_{ER}$, and $BH_{EX}$ in the group of estimated unknowns $X_n$ approach the true values of the unknowns $\theta_{MA}$, $\theta_{EX}$, and $H_{EX}$ in the group of unknowns X. According to the present embodiment, it thus becomes possible to generate a highly-accurate angle detection value $\theta s$ with reduced angle error caused by a noise magnetic field Mex even if the strength Hdi and angle $\theta di$ of the detection-target magnetic field at a detection position Pi are not appropriate to be represented by linear functions.

Next, a description will be given of the results of a simulation that was performed to examine the effect of the present embodiment. The simulation used a model of the angle sensor system 100 with four detection positions and four magnetic sensors. The four detection positions were different from each other. The four magnetic sensors in the model of the angle sensor system 100 will be referred to as first to fourth magnetic sensors, and respective detection values generated by the first to fourth magnetic sensors will be referred to as first to fourth detection values $\theta s1$, $\theta s2$, $\theta s3$, and $\theta s4$.

The simulation determined an angle error occurring in the angle detection value $\theta s$ generated by the model of the angle sensor system 100 in the presence of a noise magnetic field Mex having a constant direction and strength. In the simulation, the angle error was defined as a difference between the angle detection value $\theta s$ and the detection-target angle $\theta$.

The simulation also determined respective errors of the first to fourth detection values $\theta s1$, $\theta s2$, $\theta s3$ and $\theta s4$. In the simulation, the error of the first detection value $\theta s1$ was defined as a difference between the first detection value $\theta s1$ and the detection-target angle $\theta$; the error of the second detection value $\theta s2$ was defined as a difference between the second detection value $\theta s2$ and the detection-target angle $\theta$; the error of the third detection value $\theta s3$ was defined as a difference between the third detection value $\theta s3$ and the detection-target angle $\theta$; and the error of the fourth detection value θs4 was defined as a difference between the fourth detection value θs4 and the detection-target angle θ.

In the simulation, the strength and direction of the detection-target magnetic field were modeled so that the strength Hdi and angle θdi of the detection-target magnetic field at a detection position Pi were represented by the functions on the right-hand sides of Eqs. (2) and (3), respectively, and those functions included periodic functions with k of 2 in value. In the simulation, an average value of the strengths of the detection-target magnetic field applied to the first to fourth magnetic sensors was set at 30 mT, and the strength of the noise magnetic field Mex was set at 5 mT.

Figure 11:
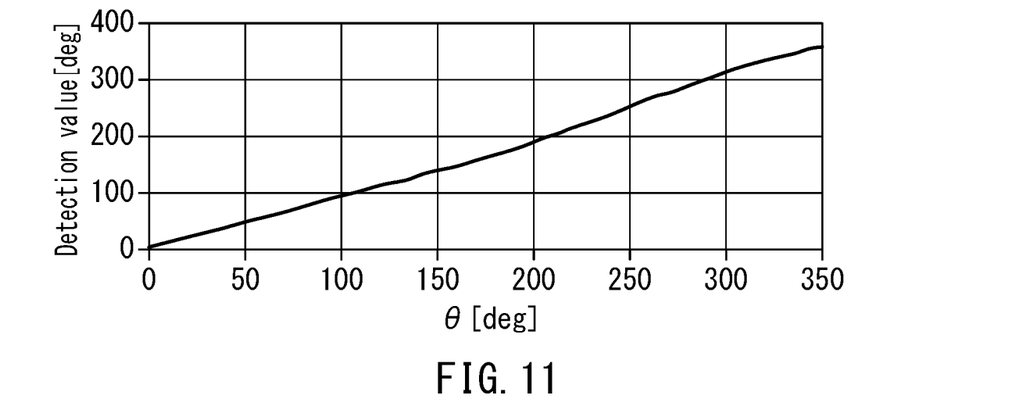
FIG. 11 is a characteristic chart showing changes in a fourth detection value in a simulation.
Figure 12:
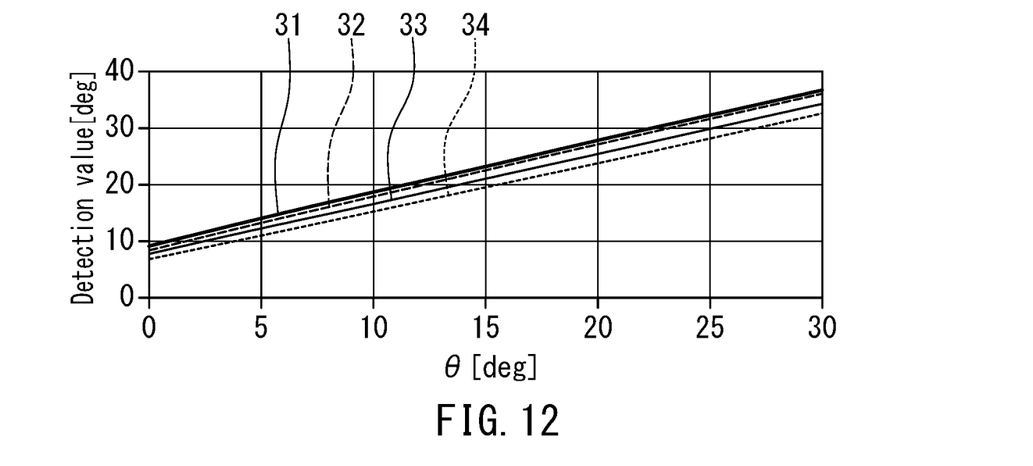
FIG. 12 is a characteristic chart showing changes in first to fourth detection values in the simulation.

FIGS. 11 and 12 are characteristic charts showing changes in the first to fourth detection values θs1 to θs4 obtained by the simulation. FIG. 11 shows changes in the fourth detection value θs4, as a representative of all the first to fourth detection values θs1 to θs4, with changes in the detection-target angle θ. FIG. 12 shows changes in the first to fourth detection values θs1 to θs4 with changes in the detection-target angle θ within part of the range of the detection-target angle θ shown in FIG. 11. In FIGS. 11 and 12, the horizontal axis represents the detection-target angle θ, and the vertical axis represents the detection values. In FIG. 12, the reference numeral 31 represents the first detection value θs1, the reference numeral 32 the second detection value θs2, the reference numeral 33 the third detection value θs3, and the reference numeral 34 the fourth detection value θs4. As shown in FIG. 12, the first to fourth detection values θs1 to θs4 change with the detection-target angle θ in manners different from each other.

Figure 13:
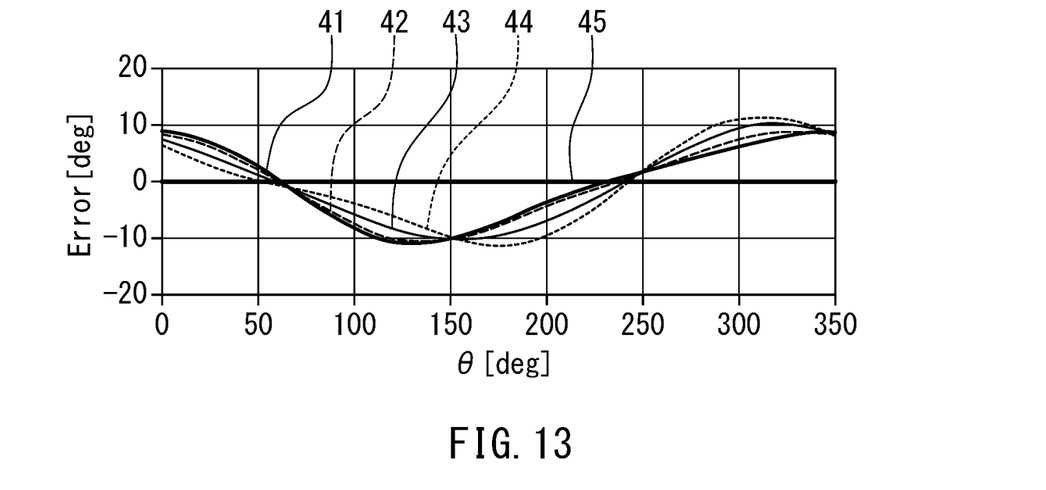
FIG. 13 is a waveform diagram showing changes in errors of the first to fourth detection values and an angle error in the simulation.

FIG. 13 is a characteristic chart showing changes in the errors of the first to fourth detection values θs1 to θs4 and the angle error obtained by the simulation. In FIG. 13, the horizontal axis represents the detection-target angle θ, and the vertical axis represents error. The error on the vertical axis is a generic term referring to the errors of the first to fourth detection values θs1 to θs4 and the angle error. In FIG. 13, the reference numeral 41 represents the error of the first detection value θs1, the reference numeral 42 the error of the second detection value θs2, the reference numeral 43 the error of the third detection value θs3, and the reference numeral 44 the error of the fourth detection value θs4. The reference numeral 45 represents the angle error.

As shown in FIG. 13, the errors of the first to fourth detection values θs1 to θs4 are relatively large, whereas the angle error is almost zero. The errors of the first to fourth detection values θs1 to θs4 are errors caused by the noise magnetic field Mex. The errors of the first to fourth detection values θs1 to θs4 can each be regarded as an angle error of an angle detection value generated by a magnetic sensor device having only a single magnetic sensor. As shown in FIG. 13, the present embodiment makes it possible to generate an angle detection value θs with reduced angle error caused by a noise magnetic field Mex, as compared to a magnetic sensor device having only a single magnetic sensor.

The present invention is not limited to the foregoing embodiment, and various modifications may be made thereto. For example, the angle sensor system of the present invention may include a magnetic scale instead of the magnet 6 as the magnetic field generator 5, the magnetic scale including a plurality of pairs of N and S poles arranged alternately in a liner configuration, with a plurality of magnetic sensors arranged in the vicinity of the periphery of the magnetic scale. In such a case, it is required that the relative position of the magnetic scale with respect to a plurality of detection positions be variable linearly in the direction in which the N and S poles of the magnetic scale are arranged. The angle to be detected in such a case may be an angle that represents the relative position of the magnetic scale with one pitch of the magnetic scale as 360°.

Obviously, many modifications and variations of the present invention are possible in the light of the above teachings. Thus, it is to be understood that, within the scope of the appended claims and equivalents thereof, the invention may be practiced in other embodiments than the foregoing most preferable embodiment.

What is claimed is:

1. An angle sensor for generating an angle detection value having a correspondence with an angle to be detected, comprising: a plurality of magnetic sensors for detecting a composite magnetic field at a plurality of detection positions different from each other and generating a plurality of detection values that represent directions of the composite magnetic field, the composite magnetic field being a composite of a magnetic field to be detected and a noise magnetic field other than the magnetic field to be detected; and a processor for generating the angle detection value, wherein at the plurality of detection positions, directions of the magnetic field to be detected change with the angle to be detected, manners in which either the directions or strengths, or both of the directions and strengths of the magnetic field to be detected change with the angle to be detected vary among the plurality of detection positions, the processor assumes a group of unknowns, a group of provisional unknowns, and a group of estimated unknowns, the group of unknowns is a set of a first unknown, a second unknown, and a third unknown, the first unknown is a value corresponding to the angle detection value, the second unknown is a value corresponding to a direction of the noise magnetic field, the third unknown is a value corresponding to a strength of the noise magnetic field, the group of provisional unknowns is a set of provisional values of the first to third unknowns, the group of estimated unknowns is a set of estimated values of the first to third unknowns, and the processor executes a first process and a second process so that the number of executions of the first process is two or more, the first process being a process for determining the group of estimated unknowns on the basis of the plurality of detection values and the group of provisional unknowns, the second process being a process for assuming the group of estimated unknowns determined by the first process as a new group of provisional unknowns for the first process to be executed next time, the processor further executing a third process for assuming an estimated value of the first unknown in the group of estimated unknowns determined by the last executed first process as the angle detection value;

wherein the processor further assumes approximate functions, the approximate functions being first derivatives of model functions representing the plurality of detection values with the group of unknowns as variables, and the first process determines the group of estimated unknowns on the basis of the plurality of detection values, the group of provisional unknowns, and the approximate functions;

wherein the processor further assumes a plurality of temporary detection values, a plurality of discrepancy values, a group of change amounts, and a group of approximate discrepancy values, the plurality of temporary detection values are values in the group of provisional unknowns in the model functions, the plurality of discrepancy values are differences between corresponding ones of the plurality of detection values and the plurality of temporary detection values, the group of change amounts is a set of change amounts of the estimated values of the first to third unknowns in the group of estimated unknowns with respect to the provisional values of the first to third unknowns in the group of provisional unknowns, the group of approximate discrepancy values is a set of a plurality of approximate discrepancy values corresponding to the plurality of discrepancy values, and is determined from the approximate functions and the group of change amounts, and the first process determines the group of change amounts so that the group of approximate discrepancy values becomes a set of approximate values to the plurality of discrepancy values, and further determines the group of estimated unknowns on the basis of the group of change amounts thus determined.

2. The angle sensor according to claim 1, wherein the first process determines the group of change amounts so that a sum of squares of differences between corresponding ones of the plurality of discrepancy values and the plurality of approximate discrepancy values is minimized.

3. The angle sensor according to claim 1, wherein the third process is executed if a change amount of the estimated value of the first unknown in the group of change amounts is smaller than or equal to a predetermined value.

4. The angle sensor according to claim 1, wherein the model functions are nonlinear functions including a plurality of periodic functions with the first unknown as a variable.

5. The angle sensor according to claim 1, wherein each of the plurality of magnetic sensors includes:
 a first signal generator for generating a first signal, the first signal having a correspondence with a cosine of an angle that the direction of the composite magnetic field forms with respect to a reference direction;
 a second signal generator for generating a second signal, the second signal having a correspondence with a sine of the angle that the direction of the composite magnetic field forms with respect to the reference direction; and
 a computing circuit for generating a corresponding one of the plurality of detection values on the basis of the first and second signals, the corresponding one of the plurality of detection values representing the angle that the direction of the composite magnetic field forms with respect to the reference direction.

6. The angle sensor according to claim 5, wherein each of the first and second signal generators includes at least one magnetic detection element.

7. An angle sensor system comprising:
 the angle sensor according to claim 1; and
 a magnetic field generator for generating the magnetic field to be detected.

8. The angle sensor system according to claim 7, wherein a relative position of the magnetic field generator with respect to the plurality of detection positions is variable, and
 the angle to be detected has a correspondence with the relative position of the magnetic field generator.

* * * * *